Figure 2:
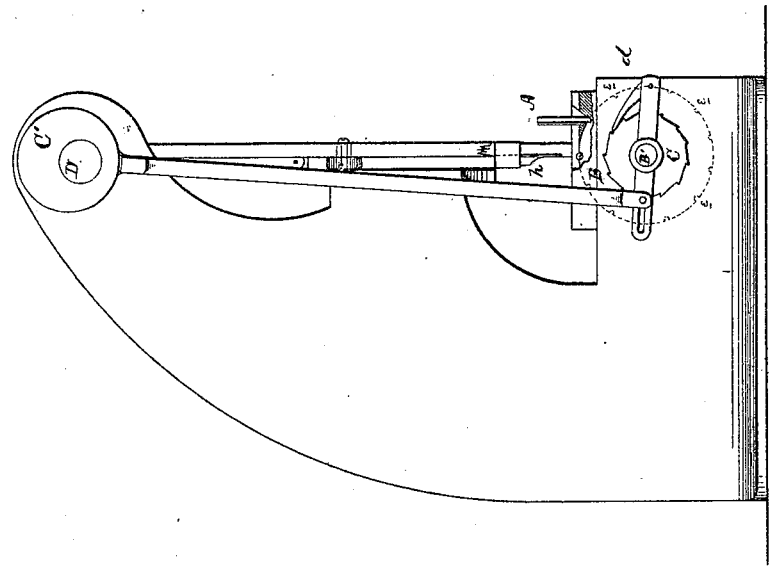

2 Sheets--Sheet 1.

J. A. FIELD.
Machines for Making Ornamental Chains.

No. 133,427.  Patented Nov. 26, 1872.

SCALE 6 INS. = FT.

WITNESSES.  INVENTOR.

A. J. Cushing
Peter F. Hughes

John A. Field.

AM. PHOTO-LITHOGRAPHIC CO. N.Y. (OSBORNE'S PROCESS.)

2 Sheets--Sheet 2.

J. A. FIELD.
Machines for Making Ornamental Chains.

No. 133,427. Patented Nov. 26, 1872.

WITNESSES.
A. J. Cushing
Peter F. Hughes

INVENTOR.
John A. Field

UNITED STATES PATENT OFFICE.

JOHN A. FIELD, OF PROVIDENCE, RHODE ISLAND.

IMPROVEMENT IN MACHINES FOR MAKING ORNAMENTAL CHAINS.

Specification forming part of Letters Patent No. 133,427, dated November 26, 1872.

*To all whom it may concern:*

Be it known that I, JOHN A. FIELD, of the city and county of Providence, in the State of Rhode Island, have invented a new and useful Improvement in Machines for Making Chain; and I do hereby declare that the following specification, taken in connection with the drawing, is a full, clear, and exact description thereof.

Figure 1:
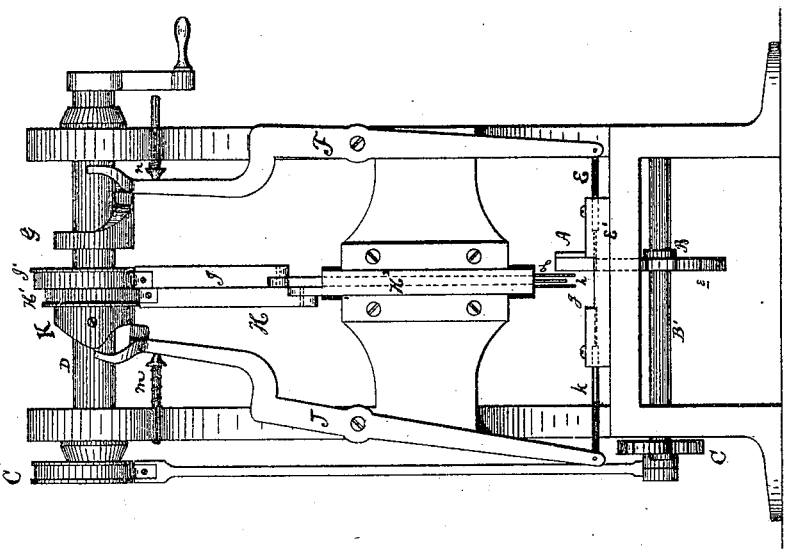
Figure 3:
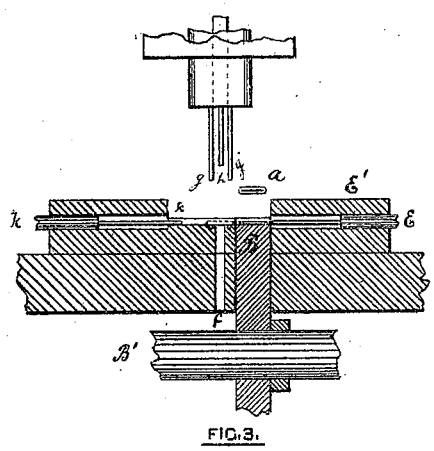
Figure 6:
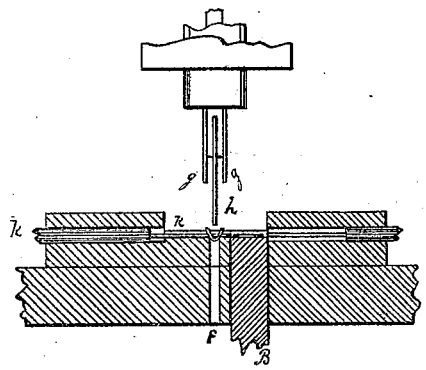
Figure 4:
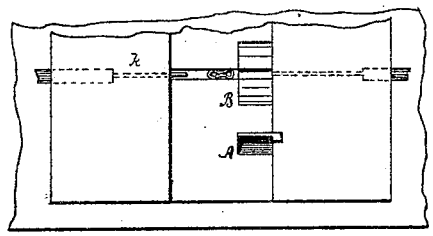
Figure 7:
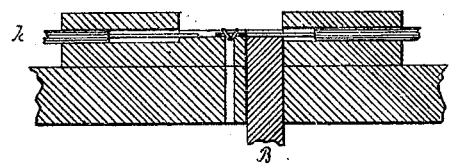
Figure 5:
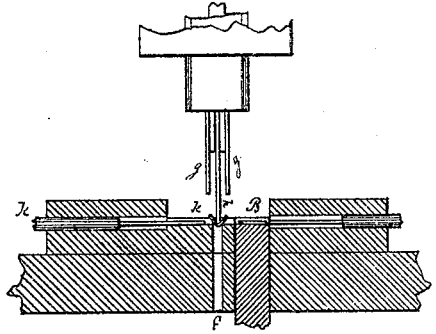
Figure 8:
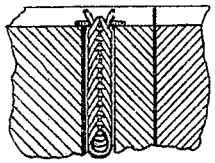

Figure 1 is a front elevation. Fig. 2 is a side elevation. Fig. 3 is a sectional view, showing a link in position in the feeding-wheel and the link in dotted lines in place ready to be operated on in the process of forming a chain. Fig. 4 is a top view of so much of the machine as is necessary to show the link after the first operation has been performed upon it. Fig. 5 is a sectional view of so much of the machine as is necessary to show the link after the second operation has been performed upon it. Fig. 6 is a sectional view of so much of the machine as is necessary to show the link after the third operation has been performed upon it. Fig. 7 is a sectional view of so much of the machine as is necessary to show the next operation in the formation of a chain. Fig. 8 is a sectional view.

The description of chain which the machine hereinafter described is designed to make is that known in the trade as "fox-tail" chain, all the links being made of wire and laid herring-bone wise.

We prefer to cut the links from sheet-metal plate, and form them into circular rings by means of dies, but they may be made from round wire and soldered at the joint, if preferred. The rings, however made, should be flattened so as to form the figure of a parallelogram with rounded ends, as seen at $a$, Fig. 3, before they are in condition to be woven into chain.

I prefer to supply the links to the machine from a stack, A, Figs. 1 and 2, which may be of any convenient height and capacity. Underneath this stack is placed a separator, B, which consists of a wheel mounted upon a transverse shaft, B', and to which an intermittent rotary movement, properly timed, is given by means of a ratchet or other suitable feed, C. In this instance the eccentric C' on the principal shaft D gives the proper vibratory movement to the pawl $d$ to work the feeding-wheel. The periphery of the separator B is furnished with transverse scores or channels $e$, equidistant from each other, and corresponding in number with the number of spaces through which the separator, in making a complete revolution, intermittently passes. Each score $e$ is capable of holding only one blank for a link, and as the several scores pass under the lower open end of the stack each will in succession take the undermost link from the pile in the stack.

Let it be supposed that one of the scores in the separator has taken a blank, and the separator revolved to the extent of one space. This will bring the blank to a point where it is exposed to view, the top surface of the table or platform of the machine being cut away and the space being occupied by a segment of the separator. In this position (the separator being now at rest) the long axis of the blank is in the line produced of the axis of a follower, $e$, Figs. 1 and 3. This follower works in guides $e'$, and is operated by the lever F through the agency of a cam, G, on the main shaft D, and which is so timed that at the proper moment it will cause the follower E to push the blank from the score and into the eyes of the next preceding link in the chain. For the present any consideration of this part of the process of building the chain will be omitted, and it may be understood that this is the first link in the chain, and that the follower pushes it to a point where its center is directly over a hole or forming-guide, $f$, Fig. 3, in the table of the machine. The pitman H, operated by the eccentric $H^1$ in the shaft D, works a stock, $H^2$, properly mounted in vertical guides. From the lower face of this stock two openers project, $g\ g$, which are simply steel wires, and their office is to enter the longitudinal slit in the blank near the ends, and form circular openings or eyes in the same. (See Fig. 4.) This done, the pitman I, operated by the eccentric I' on the shaft D, causes the punch or plunger $h$, which is set midway between the openers $g\ g$ (its stock being in this instance guided within the stock $H^2$) to descend and press upon the central portion of the link. At the same time the openers rise clear of the link, but the plunger $h$ continues to descend and forces the link into the end of the forming-guide $f$, and so that it is bent at nearly a right angle. (See Fig. 5.) The punch $h$ now rises, the link being held by the chain in the guide already formed. Next in order is the transversely-moving opener $k$, Figs. 1 and 5. The opener $k$ serves, first, as an opener to widen the opening near the ends of the links last placed; secondly, as a means for making said openings coincident with the line of the follower E, so that the succeeding link may be readily placed in position; and, thirdly, as an opener to widen the slot or opening at the bent portion of the link and cause it to fill the end spaces of the next preceding link. The movement of the opener $k$ is effected by means of the lever J, which is operated at the proper time by the cam K on the shaft D. Both the levers J and F are moved in the direction opposite to that in which they are worked by their respective cams K G when relieved from the influence of the latter by means of springs $m$ $n$. After the opener $k$ has performed its office, the follower E, which has previously returned to its first position, is ready to push another blank out of the next score in the separator, which latter, in the meantime, has revolved one space, and this blank is, by the action of the follower, inserted through the two ends of the preceding link in the space just occupied by the opener $k$, as clearly seen at Fig. 7. To facilitate the proper guiding of the blank the table of the machine is channeled in a line coincident with the axis of the follower E and opener $k$. All the hereinbefore-described operations are now to be repeated.

The effect of the plunger $h$, Fig. 5, is to force the chain already made through the forming-guide $f$, and as each new link is acted on by the plunger the ends of the next preceding link are, by the bending of the last blank, drawn inward so that they meet and give the herring-bone formation seen at Fig. 8.

I do not limit myself to the precise construction and arangement of the several parts composing the machine as described, but mean to include all mere formal variations performing the same mode of operation by equivalent means.

What I claim as my invention, and desire to secure by Letters Patent, is—

1. The combination of the follower E, the forming-guide $f$, and link-openers $g$ $g$, substantially as described.

2. The combination of the follower E, the separator B, and link-openers $g$ $g$, substantially as described.

3. The combination and arrangement of the link-openers $g$ $g$, the plunger $h$, and forming-guide $f$, substantially as described.

4. The combination of the plunger $h$, link-openers $k$ and $g$ $g$, and the follower E, substantially as described.

5. The combination of the follower E, separator B, link-openers $g$ $g$, plunger $h$, forming-guide $f$, and link-opener $k$, all constituting, when organized substantially as described, an improved machine for making chain.

JOHN A. FIELD.

Witnesses:
A. J. CUSHING,
PETER F. HUGHES.